US009836798B2

(12) United States Patent
White et al.

(10) Patent No.: US 9,836,798 B2
(45) Date of Patent: Dec. 5, 2017

(54) CROSS-NETWORK SOCIAL NETWORKING APPLICATION ARCHITECTURE

(75) Inventors: William MacDonald White, Sausalito, CA (US); Steven Horowitz, Oakland, CA (US)

(73) Assignee: EXCALIBUR IP, LLC, New York, NY (US)

( * ) Notice: Subject to any disclaimer, the term of this patent is extended or adjusted under 35 U.S.C. 154(b) by 766 days.

(21) Appl. No.: 12/261,679

(22) Filed: Oct. 30, 2008

(65) Prior Publication Data

US 2010/0114788 A1 May 6, 2010

(51) Int. Cl.
*H04L 12/58* (2006.01)
*G06Q 50/00* (2012.01)
*G06Q 30/02* (2012.01)

(52) U.S. Cl.
CPC ............ *G06Q 50/01* (2013.01); *G06Q 30/02* (2013.01); *H04L 51/32* (2013.01)

(58) Field of Classification Search
CPC ......... G06Q 50/01; G06Q 30/02; H04L 51/32
USPC .................. 709/204–207; 707/770, 966–974
See application file for complete search history.

(56) References Cited

U.S. PATENT DOCUMENTS

| | | | | |
|---|---|---|---|---|
| 5,583,983 A | * | 12/1996 | Schmitter | 717/138 |
| 2004/0158820 A1 | * | 8/2004 | Moore et al. | 717/136 |
| 2007/0050838 A1 | * | 3/2007 | Liu et al. | 726/3 |
| 2008/0172344 A1 | * | 7/2008 | Eager | G06Q 30/02 705/80 |
| 2008/0288582 A1 | * | 11/2008 | Pousti et al. | 709/203 |

OTHER PUBLICATIONS

Organization for the Advancement of Structured Information Standards (OASIS), Introduction to UDDI: Important Features and Functional Concepts, Oct. 2004, available at http://uddi.org/pubs/uddi-tech-wp.pdf.*
Introduction to UDDI: Important Features and Functional Concepts. Oct. 2004.*

* cited by examiner

*Primary Examiner* — Scott B Christensen
(74) *Attorney, Agent, or Firm* — James J. DeCarlo; Greenberg Traurig, LLP (57) ABSTRACT

Particular embodiments of the present invention are directed to providing an application programming interface allowing developers to create a single version of a social networking application configured to execute on more than one social network, wherein such execution may be customized with respect to each particular social network in which the social networking application may execute. The same or alternative embodiments may also provide an application programming interface for saving and/or retrieving social networking application data in and/or from a common data store, allowing aggregation of data specific to the cross-network social networking application such that the data is available across multiple social networks.

12 Claims, 8 Drawing Sheets

CROSS-NETWORK SOCIAL NETWORKING APPLICATION ARCHITECTURE

TECHNICAL FIELD

The present disclosure generally relates to social network applications.

BACKGROUND

As the popularity of the Internet has increased, so has the prevalence of social networking websites and applications. Generally speaking, a social network refers to an application or service that facilitates the building of online communities of people who share interests and activities, or who are interested in exploring the interests and activities of others. Many social networks are web-based and provide a variety of ways for users to interact, such as e-mail and instant messaging services. Some examples of social networks are delicio.us (http://del.icio.us./), facebook (http://www.facebook.com), Flickr (http://www.flickr.com), MySpace (http://www.myspace.com) and others.

Many social networks host social networking applications that add to the usability and user desirability of the social network service. For example, a social network may include an embedded chat/instant messaging application that allows users of the social network service to communicate in substantially real-time with each other. Another example of a social networking application is an online game in which users may play with and/or against each other.

Due to the popularity of many social network services, developers of social networking applications often prefer to develop their applications for many social network services in order to broaden the applications' audiences. However, this often requires developers to develop different versions of their applications for each social network, because different social networks may use different application program interfaces (APIs) and/or other different technologies. Accordingly, to update a particular social networking application, the developer must update each different version of the application, which may be laborious, inefficient, and prone to introduction of bugs.

In addition, because different social networking services typically use different versions of a particular social networking application, users of an application on one social networking service have historically been unable to interact with users of a corresponding application on another social networking service.

While certain approaches have been utilized to allow cross-network interaction in applications, such approaches have disadvantages. For example, many cross-network social networking applications utilize OpenSocial, an application programming interface that defines common application functionality across many social networks. However, the common application functionality is often merely a common subset or "lowest common denominator" of functionality for all social networks upon which the application executes. Such an approach may be undesirable, as it does not allow use of functionality or extensions supported by some social networks, but not others. Stated another way, if one social network supports particular application functionality and another social network does not, the common application generally does not include the particular functionality.

SUMMARY

The present invention provides methods, apparatuses and systems directed to creating cross-network social applications configured to execute on more than one social network. Particular implementations of the invention are directed to providing an application programming interface allowing a developer to create a single version of an application configured to execute on multiple different social networks, wherein such execution may be customized with respect to each of the different social networks.

DESCRIPTION OF EXAMPLE EMBODIMENT(S)

A. Overview

Particular implementations of the invention are directed to providing an application programming interface allowing a developer to create a single version of a social networking application configured to execute on multiple social networks, wherein such execution may be customized with respect to a particular one of the multiple social networks. Typically, in order for a social networking application to execute on many different social networks, a developer must create different versions of the application specifically tailored to the application programming interfaces and technologies associated with each of the social networks. Accordingly, when a developer updates the application, each different version of the application must be changed, which may be laborious, inefficient, and prone to introduction of bugs. Also, as different social networks run different versions of a particular social network application, users of an application on one social networking service are typically unable to interact with users of a corresponding application on another social networking service.

As discussed in more detail below, particular implementations of the invention may reduce disadvantages associated with the development of social networking applications using traditional methods, and may also improve user experience.

In a particular implementation, social application toolkit functions may be used by a developer to create a cross-network social networking application. Such social application toolkit functions may interact with and/or call one or more social platform functions that may provide an interface and/or abstraction layer between the social application toolkit functions and the individual social networks. Social platform functions may provide a common interface for various functional features of individual social networks, thus allowing a cross-network social networking application, upon execution, to render different functionality (e.g., user interface) on different social networks based upon whether such functionality is supported by each particular social network.

In another implementation, the social application toolkit functions may interact with and/or call one or more social application data functions. Such social application data functions may save and/or retrieve social networking application data in and/or from a common data store, allowing aggregation of data specific to the cross-network social networking application such that the data is available across multiple social networks.

The present invention can be implemented in a variety of manners, as discussed in more detail below. Other implementations of the invention may be practiced without some or all of specific details set forth below. In some instances, well known structures and/or processes have not been described in detail so that the present invention is not unnecessarily obscured.

A.1. Example Network Environment

Particular implementations of the invention operate in a wide area network environment, such as the Internet, including multiple network addressable systems. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like.

Figure 1:
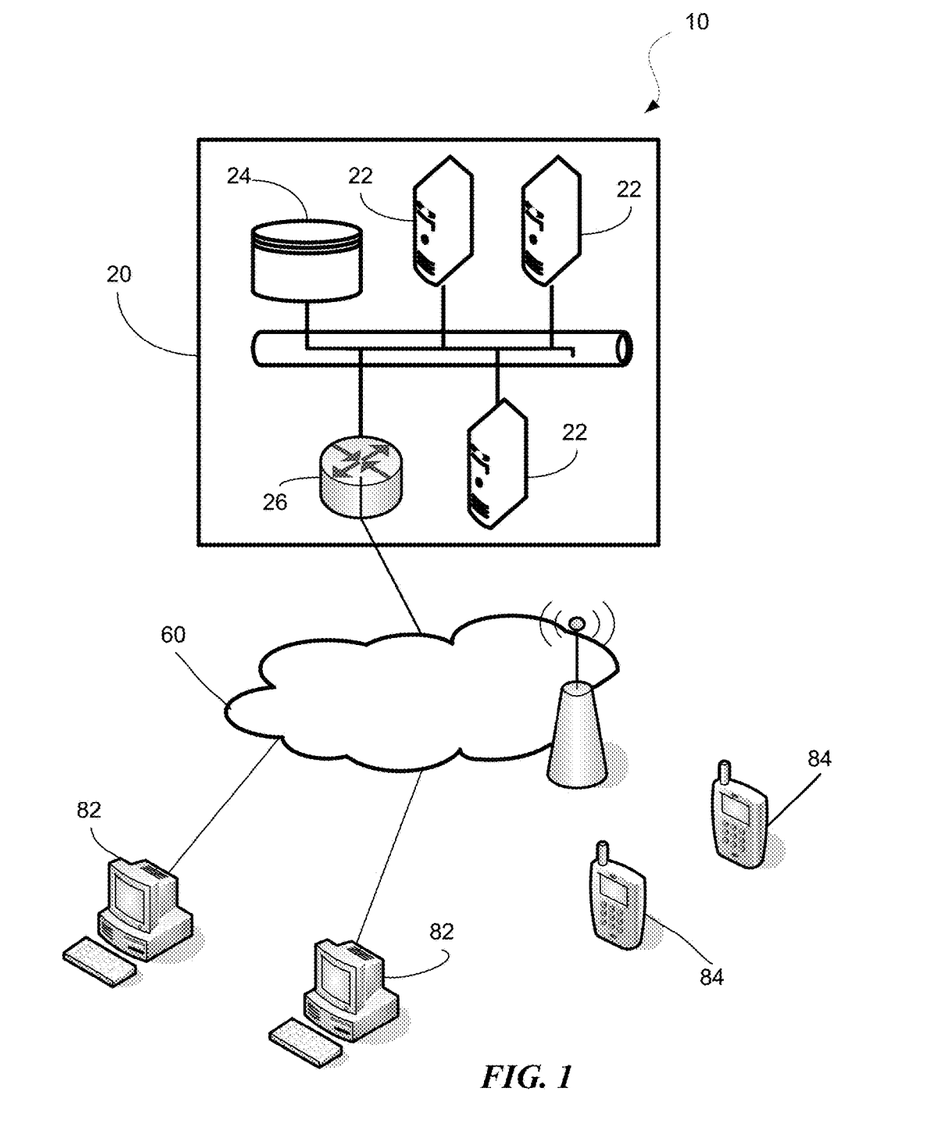
FIG. 1 is a schematic diagram that illustrates an example network environment in which particular implementations of the invention may operate.

As FIG. 1 illustrates, a particular implementation of the invention can operate in a network environment comprising network application hosting site 20, such as an informational web site, social network site and the like. Although FIG. 1 illustrates only one network application hosting site, implementations of the invention may operate in network environments that include multiples of one or more of the individual systems and sites disclosed herein. Client nodes 82, 84 are operably connected to the network environment via a network service provider or any other suitable means.

Network application hosting site 20 is a network addressable system that hosts a network application accessible to one or more users over a computer network. The network application may be an informational web site where users request and receive identified web pages and other content over the computer network. The network application may also be a search platform, an on-line forum or blogging application where users may submit or otherwise configure content for display to other users. The network application may also be a social network application allowing users to configure and maintain personal web pages, chat, instant message, play interactive games, etc. The network application may also be a content distribution application, such as Yahoo! Music Launchcast®, Apple® iTunes®, and podcasting servers, that displays available content, and transmits content to users.

Network application hosting site 20, in one implementation, comprises one or more physical servers 22 and content data store 24. The one or more physical servers 22 are operably connected to computer network 60 via a router 26. The one or more physical servers 22 host functionality that provides a network application (e.g., a news content site, etc.) to a user. As discussed in connection with FIG. 2, in one implementation, the functionality hosted by the one or more physical servers 22 may include web or HTTP servers, ad serving systems, geo-targeting systems, and the like. Still further, some of the functionality described herein may be accessible using an HTTP interface or presented as a web service using REST, SOAP, and/or other suitable protocols.

Content data store 24 stores content as digital content data objects. A content data object or content object, in particular implementations, is an individual item of digital information typically stored or embodied in a data file or record. Content objects may take many forms, including: text (e.g., ASCII, SGML, and HTML), images (e.g., jpeg, tif and gif), graphics (vector-based or bitmap), audio, video (e.g., mpeg), or other multimedia, and combinations thereof. Content object data may also include metadata (e.g., titles, captions, descriptions. annotations, etc.) and executable code objects (e.g., games executable within a browser window or frame), podcasts, etc. Structurally, content data store 24 connotes a large class of data storage and management systems. In particular implementations, content data store 24 may be implemented by any suitable physical system including components, such as database servers, mass storage media, media library systems, and the like.

Network application hosting site 20, in one implementation, provides web pages, such as front pages, that include an information package or module describing one or more attributes of a network addressable resource, such as a web page containing an article or product description, a downloadable or streaming media file, and the like. The web page may also include one or more ads, such as banner ads, text-based ads, sponsored videos, games, and the like. Generally, web pages and other resources include hypertext links or other controls that a user can activate to retrieve additional web pages or resources. A user "clicks" on the hyperlink with a computer input device to initiate a retrieval request to retrieve the information associated with the hyperlink or control.

Figure 2:
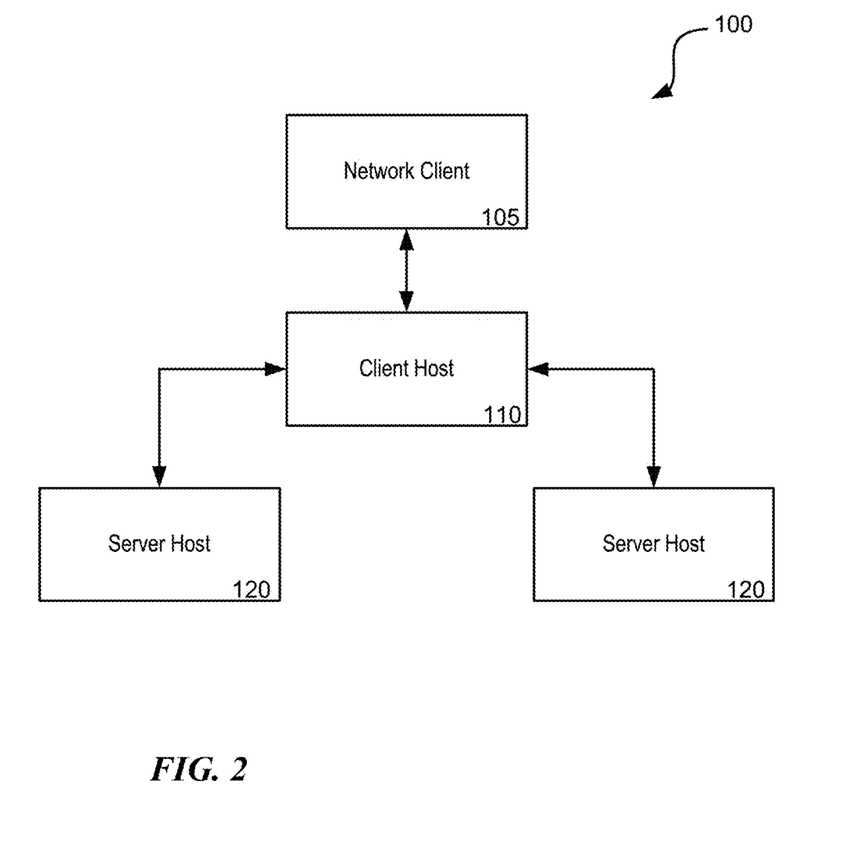
FIG. 2 is a schematic diagram illustrating a client host environment to which implementations of the invention may have application.

FIG. 2 illustrates the functional modules of a client host server environment 100 within network application hosting site 20 according to one particular implementation. As FIG. 2 illustrates, network application hosting site 20 may comprise one or more network clients 105 and one or more client hosts 110 operating in conjunction with one or more server hosts 120. The foregoing functional modules may be realized by hardware, executable modules stored on a computer readable medium, or a combination of both. The functional modules, for example, may be hosted on one or more physical servers 22 and/or one or more client computers 82, 84.

Network client 105 may be a web client hosted on client computers 82, 84, a client host 110 located on physical server 22, or a server host located on physical server 22. Client host 110 may be an executable web or HTTP server module that accepts HyperText Transport Protocol (HTTP) requests from network clients 105 acting as a web clients, such web browser client applications hosted on client computers 82, 84, and serving HTTP responses including contents, such as HyperText Markup Language (HTML) documents and linked objects (images, advertisements, etc.). Client host 110 may also be an executable module that accepts Simple Object Access Protocol (SOAP) requests from one or more client hosts 110 or one or more server hosts 120. In one implementation, client host 110 has the capability of delegating all or part of single or multiple requests from network client 105 to one or more server hosts 120. Client host 110, as discussed above, may operate to deliver a network application, such as an informational web page or an internet search service.

In a particular implementation, client host 110 may act as a server host 120 to another client host 110 and may function to further delegate requests to one or more server hosts 120 and/or one or more client hosts 110. Server hosts 120 host one or more server applications, such as an ad selection server, sponsored search server, content customization server, and the like.

A.2. Client Nodes & Example Protocol Environment

A client node is a computer or computing device including functionality for communicating over a computer network. A client node can be a desktop computer 82, laptop computer, as well as mobile devices 84, such as cellular telephones, and personal digital assistants. A client node may execute one or more client applications, such as a web browser, to access and view content over a computer network. In particular implementations, the client applications allow users to enter addresses of specific network resources to be retrieved. These addresses can be Uniform Resource Locators, or URLs. In addition, once a page or other resource has been retrieved, the client applications may provide access to other pages or records when the user "clicks" on hyperlinks to other resources. In some implementations, such hyperlinks are located within web pages and provide an automated way for the user to enter the URL of another page and to retrieve that page. The pages or resources can be data records including as content plain textual information, or more complex digitally encoded multimedia content, such as software programs or other code objects, graphics, images, audio signals, videos, and so forth.

The networked systems described herein can communicate over the network 60 using any suitable communications protocols. For example, client nodes 82, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. Still further, in particular implementations, the information transmitted between hosts may be formatted as HyperText Markup Language (HTML) documents. Other structured document languages or formats can be used, such as XML, and the like.

In some client-server protocols, such as the use of HTML over HTTP, a server generally transmits a response to a request from a client. The response may comprise one or more data objects. For example, the response may comprise a first data object, followed by subsequently transmitted data objects. In one implementation, for example, a client request may cause a server to respond with a first data object, such as an HTML page, which itself refers to other data objects. A client application, such as a browser, will request these additional data objects as it parses or otherwise processes the first data object.

Mobile client nodes 84 may use other communications protocols and data formats. For example, mobile client nodes 84, in some implementations, may include Wireless Application Protocol (WAP) functionality and a WAP browser. The use of other wireless or mobile device protocol suites are also possible, such as NTT DoCoMo's i-mode wireless network service protocol suites. In addition, the network environment may also include protocol translation gateways, proxies or other systems to allow mobile client nodes 84, for example, to access other network protocol environments. For example, a user may use a mobile client node 84 to capture an image and upload the image over the carrier network to a content site connected to the Internet.

A.3. Example Operation

In a social network, each user of the social network may access the social network via a client node 82, 84. For example, a user may access the social network via an application program available at the client node and/or via a website for the social network. Via client nodes 82, 84, each user may also create a network profile (e.g., username, password, and/or biographical information) and/or specify other users in the social network for which the user is a "friend" or has some other social relationship (e.g., a "buddy," "connection," "contact," etc.). In addition to a social link existing based on a declared relationship between users, a social link may also be derived by a social network and/or social networking application on the basis of affinities, shared interests, demographic information, and/or psychographic information of the users. The social network service, individual social networking applications, user profile, identity of users' friends, and/or other biographical information may be hosted at network application hosting site 20. Users using client nodes 82, 84 may access the social network and its associated social networking applications via network cloud 60.

As mentioned previously, developers may create social networking applications that execute in connection with a social network. For example, a social networking application may be "embedded" into the social network webpage, and users accessing the social network may use the social networking application to enhance their experience. Non-limiting examples of social networking applications include chat rooms, messaging services (e.g., e-mail, comments, "writing" on a "wall"), and interactive games (e.g., board games, poker, etc.).

Figure 3:
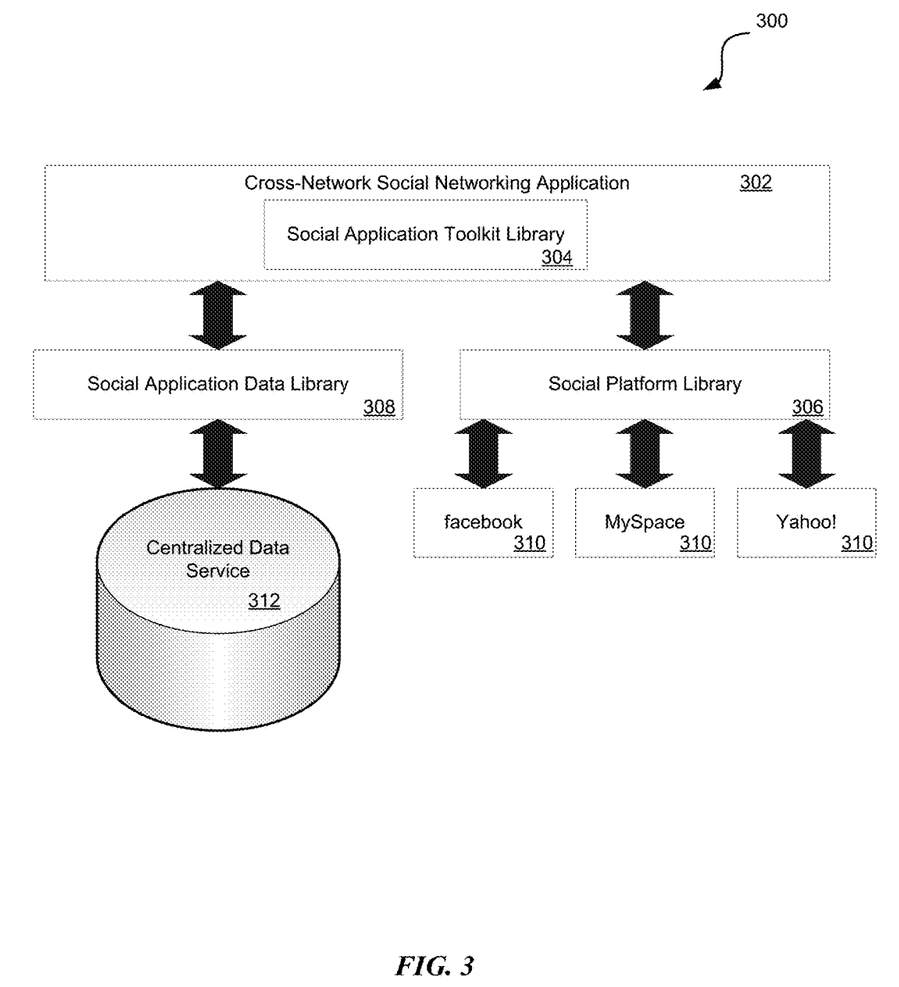
FIG. 3 illustrates a programming architecture for the development of cross-network social networking applications to which implementations of the invention may have application.

FIG. 3 illustrates a programming architecture 300 or "framework" for the development of cross-network social networking applications according to certain embodiments of the present invention. As depicted in FIG. 3, a cross-network social networking application 302 may be created by including functions from a social application toolkit library 304. During operation of the cross-network social networking application 302, social networking application 302, including each social application toolkit library function, may interact with one or more functions from social platform library 306. Cross-network social networking application 302 and such social platform library functions may interact with individual social networks 310 to access functionality associated with the particular social networks. Cross-network social networking application 302 and each social application toolkit library function may also interact with one or more functions from social application data library 308. Such social application data library functions may provide instructions to save, retrieve, and/or otherwise process social networking application data associated with the social networking application and/or the social network upon which the application is running. Such social networking application data may be stored to and retrieved from a computer readable medium, e.g. centralized data service 312.

In some embodiments, a developer may develop cross-network social networking application 302 using a single programming language and/or standard, and social networking application 302 may be published to one or more social networks as a single executable file and/or set of files. After completion of development, the executable file and/or set of files embodying cross-network social networking application 302 may then be deployed to one or more social networks 310 supported by social networking application 302. As a non-limiting example, cross-network social networking application 302 may be embodied in an executable Flash file (e.g., a .swf file), and when executed, may run "embedded" on one or more social network websites. As another non-limiting example, cross-network social networking application 302 may be embodied in PHP code on a server (e.g., network application hosting site 20), and when executed, may generate one or more social network webpages including cross-network social networking application 302.

As mentioned above, during execution, cross-network social networking application 302 may execute one or more functions from social application toolkit library 304. Each function of social application toolkit library 304 may include computer-executable instructions that, when executed, display information associated with social networking application 302 to a user of a social network 310 (e.g., to a display device or other user interface of a client node 82, 84). For example, social application toolkit library 304 may include instructions that, for example, display biographical information regarding the user, information regarding to user's friends and/or contacts, and/or display a display component (e.g., window, tab, dialog box, text box, drop-down box, button, image, and/or other graphical component) related to the functionality of social networking application 302. As a specific example, social application toolkit library 304 may include instructions for displaying the "Send a message" application widgets depicted in FIGS. 4a, 4b 4c, and 4d including the various graphical components making up the widget.

One or more functions of social application toolkit library 304 may also include instructions to "call" one or more functions of social platform library 306. Conceptually, social platform library 306 may be seen as a set of functions providing a common interface between cross-network social networking application 302 and individual social networks 310. In embodiments in which cross-network social networking application 302 is an executable Flash file, one or more functions of social platform library 306 may include ActionScript components. Each function of social platform library 306 may include computer-executable instructions that determine the particular social network 310 upon which social networking application 302 is running, and conditionally execute further instructions based on the determined social network 310. In certain embodiments, one or more functions of social platform library 306 may access and/or execute functionality of the social networking application 302 associated with individual social networks 310. For example, functions of social platform library 306 may be operable to retrieve a social network profile associated with a user, retrieve the identity of a user's friends, send or receive a message in accordance with messaging standards or protocol associated with one or more of the social networks 310, send or receive an invite in accordance with the standards or protocols associated with one or more of the social networks 310, and/or publish application activity to one or more of the social networks 310.

Figure 4A:
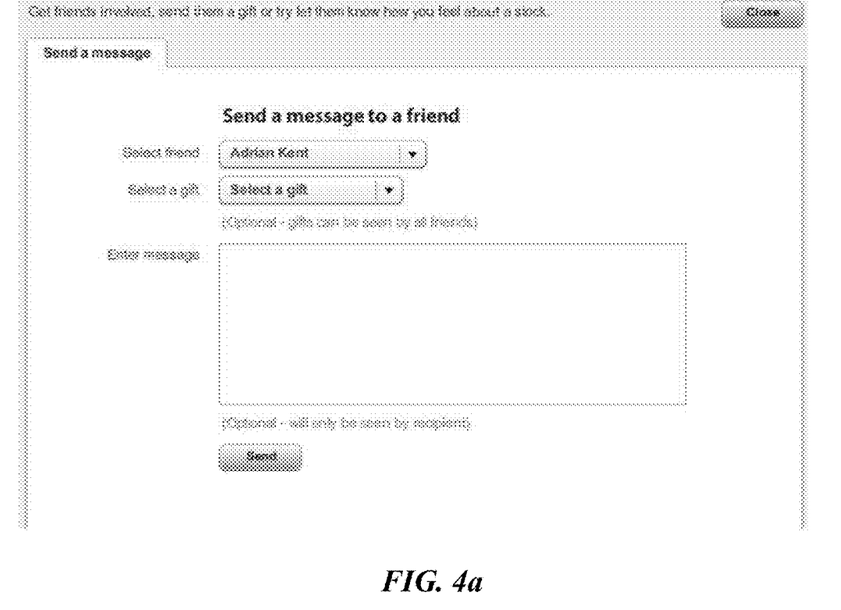
FIGS. 4a, 4b, 4c, 4d, 5a and 5b illustrate example interface screens that may be displayed to a user of a cross-network social networking application.
Figure 4B:
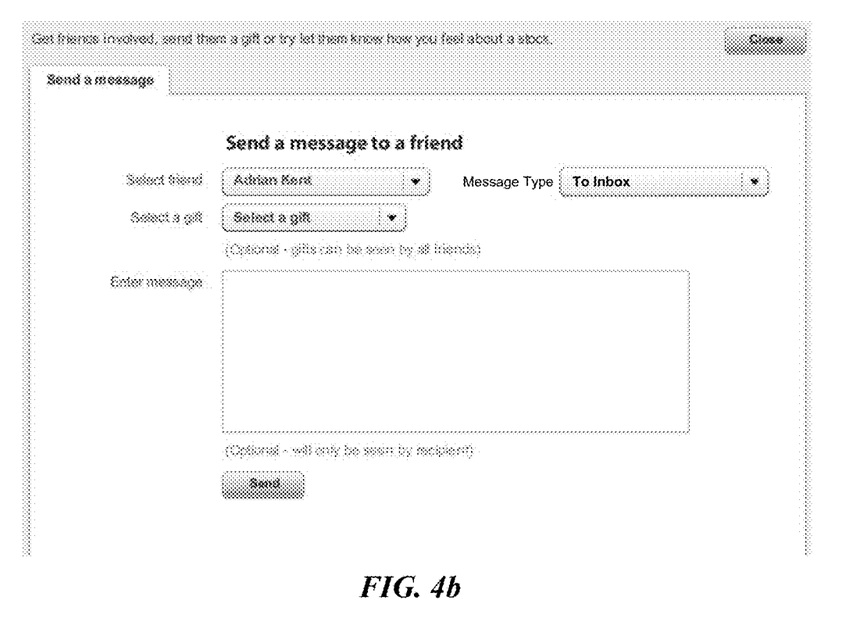

In addition, functions of social platform library 306 may be operable to determine whether individual features of social networking application 302 are compatible with and/or supported by particular social networks 310, and conditionally execute such individual features based on such determinations. For example, a developer may create a social networking application 302, using application toolkit functions to create a user interface having numerous user interface components including a "Message Type" drop-down menu allowing a user to select a type of message to be sent (e.g., "To Inbox," or "To Wall"), such as shown in FIG. 4b, for example. Each social network 310 may or may not support functionality related to the "Message Type" selection of social networking application 302. Thus, when social networking application 302 executes in a particular social network 310, the social application toolkit function for displaying the "Message Type" dropdown may "call" an associated function of social platform library 306. The social platform library function may in turn determine whether the "Message Type" selection feature is supported by the particular social network 310. If the social platform library function determines that the "Message Type" selection feature is not supported by the particular social network 310, the function may execute instructions such that the "Message Type" drop-down does not display in the particular social network 310, e.g., as shown in FIG. 4a. Otherwise, if the social platform library function determines that the "Message Type" selection feature is supported, the function may execute instructions to display the "Message Type" drop-down, e.g., as shown in FIG. 4b.

Figure 4C:
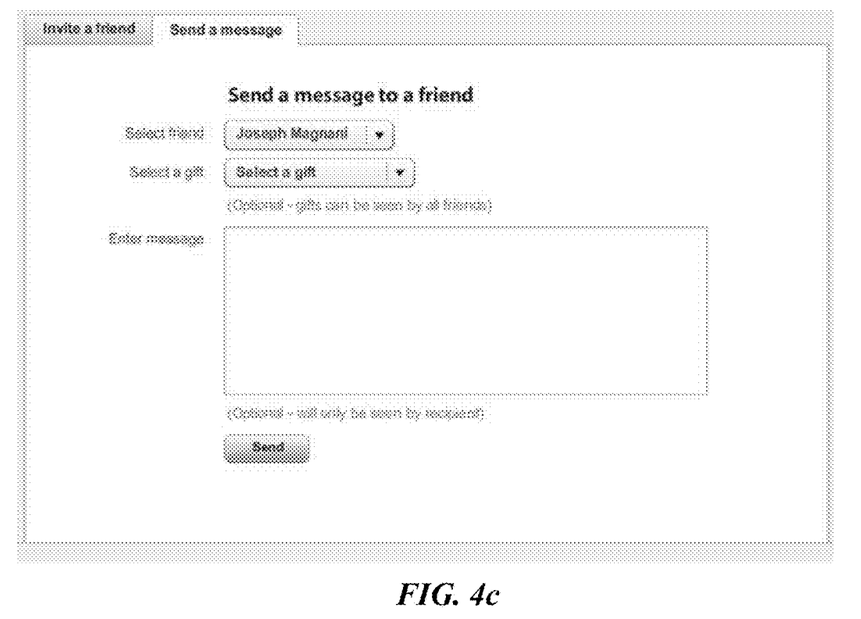
Figure 4D:
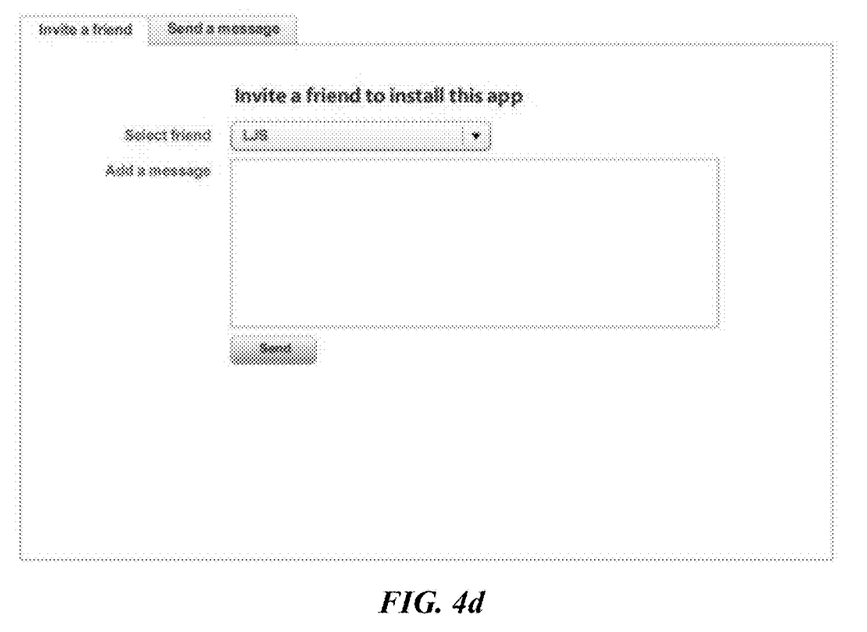

As another example, a developer may create social networking application 302, using social application toolkit functions to create a user interface having a "Send a message" tab and an "Invite a friend" tab. Each social network 310 may or may not support functionality related each of the "Send a message" and "Invite a friend" features of social networking application 302. Thus, when social networking application 302 executes in a particular social network 310, the social application toolkit function for displaying the "Invite a friend" tab may "call" an associated function of social platform library 306. The social platform library function may in turn determine whether the "Invite a friend" feature is supported by the particular social network 310. If the social platform library function determines that the "Invite a friend" feature is not supported by the particular social network 310, the function may execute instructions such that the "Invite a friend" tab does not display in the particular social network 310, e.g., as shown in FIG. 4a. Otherwise, if the social platform library function determines that the "Invite a friend" feature is supported, the function may execute instructions to display the "Invite a friend" tab and/or its related user interface components, e.g., as shown in FIGS. 4c and 4d.

As mentioned above, during execution, cross-network social networking application 302 may execute one or more functions from social application toolkit library 304. Each function of social application toolkit library 304 may include computer-executable instructions operable to display information associated with social networking application 302 to a user of a social network 310 (e.g., to a display device or other user interface to a client node 82, 84).

One or more functions of social application toolkit library 304 may also include instructions to "call" one or more functions of social application data library 308. Conceptually, social application data library 308 may be seen as a set of input/output requests providing an interface between cross-network social networking application and 302 and centralized data service 312. Each function of social application data library 308 may include computer-executable instructions operable to transmit data associated with social networking application 302 to centralized data service 312, receive data associated with social networking application 302 from centralized data service 312, and/or otherwise process data associated with centralized data service 312. Centralized data service 312 may include computer-readable media for storing data associated with social networking application 302, or may include one or more services including computer-executable instructions operable to save data associated with social networking application 302 to and/or retrieve such data from a computer-readable medium (e.g., storage server, web disk, etc.). In some embodiments, centralized data service 312 may include a data management application programming interface interfaced with an associated data store. For example, centralized data service may include a set of web services that may execute in accordance with any suitable service, e.g., Google™ Application Engine and Amazon S3.

The various elements of FIG. 3 may be distributed physically, thus providing a modular approach to the creation and operation of cross-network social networking application 302. In certain embodiments, social networking application 302 may execute on a client node 82, 84, e.g., as an embedded application in a social network webpage. Social networking application 302 and each social network 310 may be hosted by a respective network application hosting site 20. In turn, computer-readable instructions embodying the functions of social platform library 306 may be stored in a data store 24 and executed by physical servers 22 associated with a hosting site 20 separate from the hosting sites associated with social networking application 302 and the individual social networks 310. Similarly, computer-readable instructions embodying the functions of social application data library 308 may be stored in a data store 24 and executed by physical servers 22 associated with a hosting site 20 separate from the hosting sites associated with social networking application 302, the individual social networks 310, and social platform library 306.

Thus, using an architecture identical or similar to that depicted in FIG. 3, a service provider may create various functions for social platform library 306 in accordance with the APIs of individual social networks 310, and update such functions from time to time in accordance with changes and/or enhancements to individual social networks 310 (e.g., changes to APIs and/or technologies). In turn, a developer may develop social networking application 302 by including functions of social application toolkit library 304 that access social platform library 306. Accordingly, the developer's social networking application 302 may execute in each social network 310 and may require little or no updating as changes to social network API's are made, because such changes may be accounted for by the service provider's maintenance of social platform library 306.

Figure 5A:
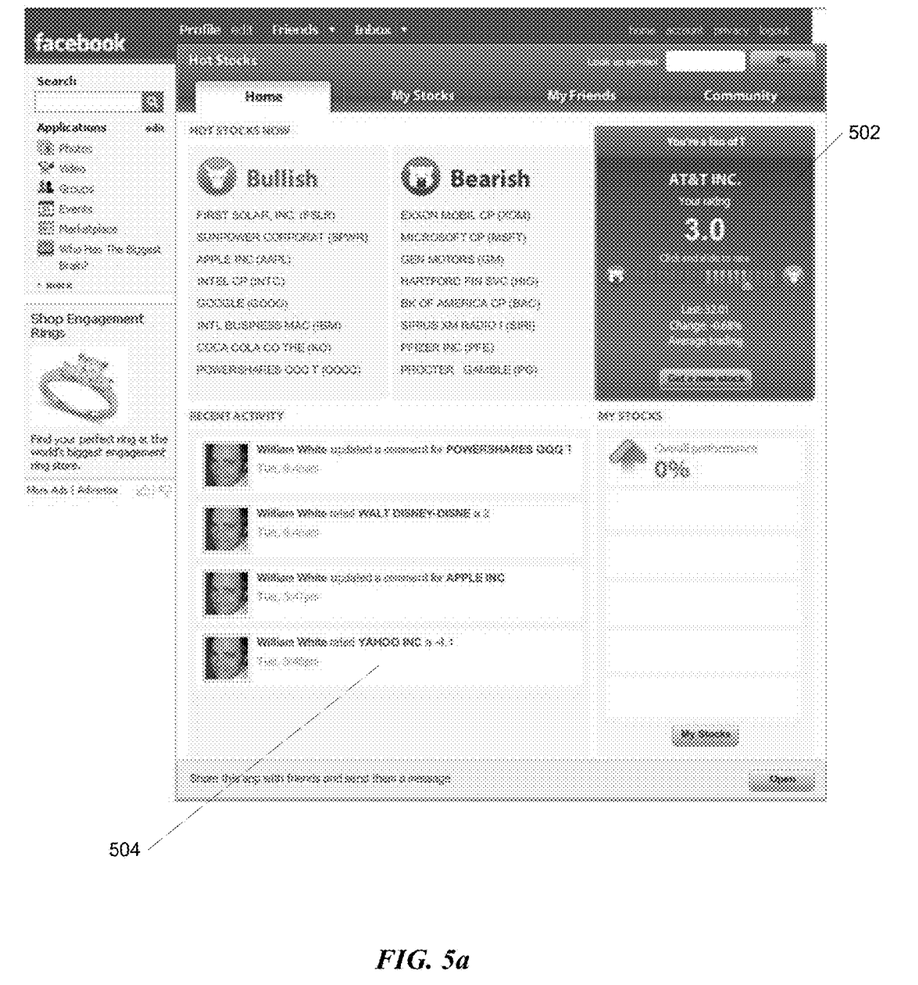
Figure 5B:
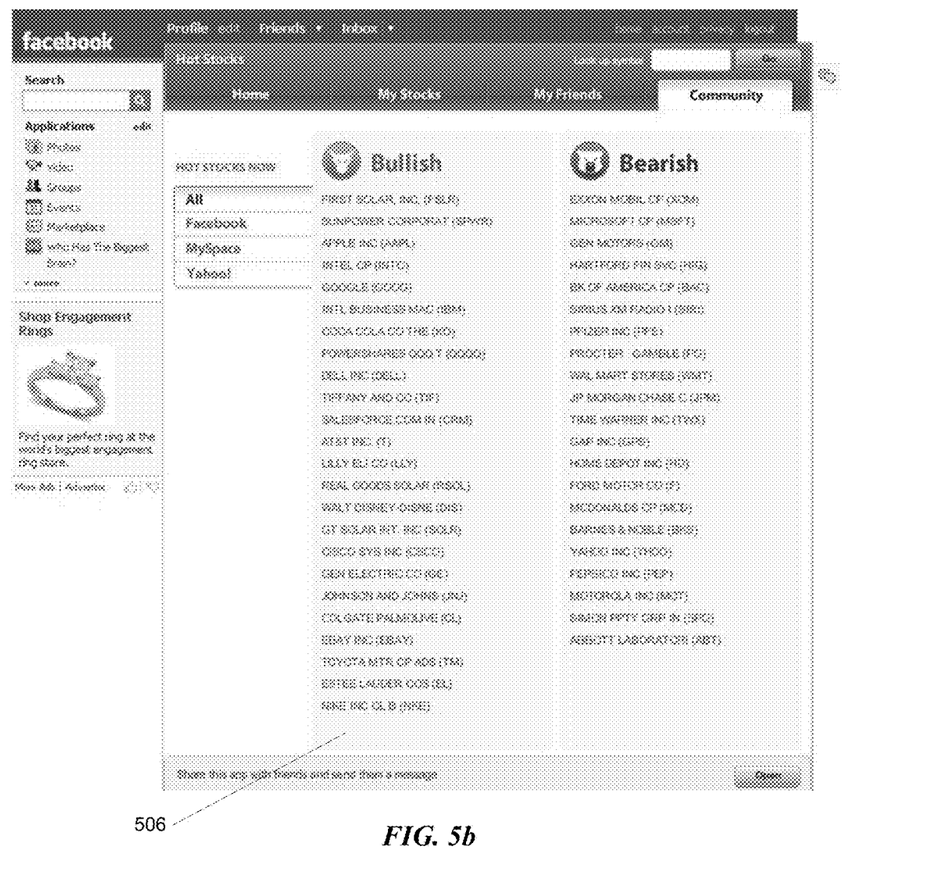

In addition, using an architecture identical or similar to that depicted in FIG. 3 may allow for aggregation of data from each social network 310 supported by a social networking application 302. Thus, data associated with a social networking application 302 (e.g., user activity, sentiment, ratings, favorites, comments, polls, votes, surveys, etc.) may be aggregated across the entire user community of social networking application 302, including all social networks 310 supported by social networking application 302. Accordingly, a member of a particular social network 310 who uses social networking application 302 may be able to view or access data relating to all users of social networking application 302, and not just those users of social networking application 302 in a particular user's designated set of "friends" in the social network 310, or who are members of the particular social network 310. An example of such social data aggregation is depicted in FIGS. 5a and 5b. As another example, a particular member of multiple social networks 310 who uses social networking application 302 may be able to view or access data relating to all users of social networking application 302 who are members of any of the social networks 310 supported by social networking application 310.

FIGS. 5a and 5b depict example interface screens of an example cross-network social networking application 302, according to certain embodiments of the present invention. As shown in FIG. 5a, a user may be prompted to provide certain data, for example the user's opinion of a particular stock, as depicted in display component 502. The user's selection may be communicated to and stored by centralized data service 312 via execution of functions of social application data library 308. In addition, information regarding other users of the cross-network social networking application 302 (e.g., such users activity, sentiment, ratings, favorites, comments, etc.) may also be displayed. As a particular example, aggregated user information stored in centralized data service 312 may be used to display actions related to the social networking application performed by other users (e.g., social network "friends" of the user), as depicted in display component 504. As another particular example, aggregated user information stored in centralized data service 312 may be used to display those stocks for which users of the social networking application are "bullish" and those for which users are "bearish," as depicted in display component 504 of FIG. 5a and display component 506 of FIG. 5b. Also, because data may be aggregated for all supported social networks, a user may view data related to all users of the social networking application 302 in the aggregate, or may filter the data by social network, as depicted in FIG. 5b. The centralized data service 312 also facilitates a user of social networking application 302 to discover, become a member of, and interact with ad hoc groups across all accessed social networks 310 formed by clustering users with the same affinities (e.g., similar sentiments, ratings, favorites, and polling, voting, and survey results).

A.4. Example Computing System Architectures

While the foregoing systems and methods can be implemented by a wide variety of physical systems and in a wide variety of network environments, the client and server host systems described below provide example computing architectures for didactic, rather than limiting, purposes.

Figure 6:
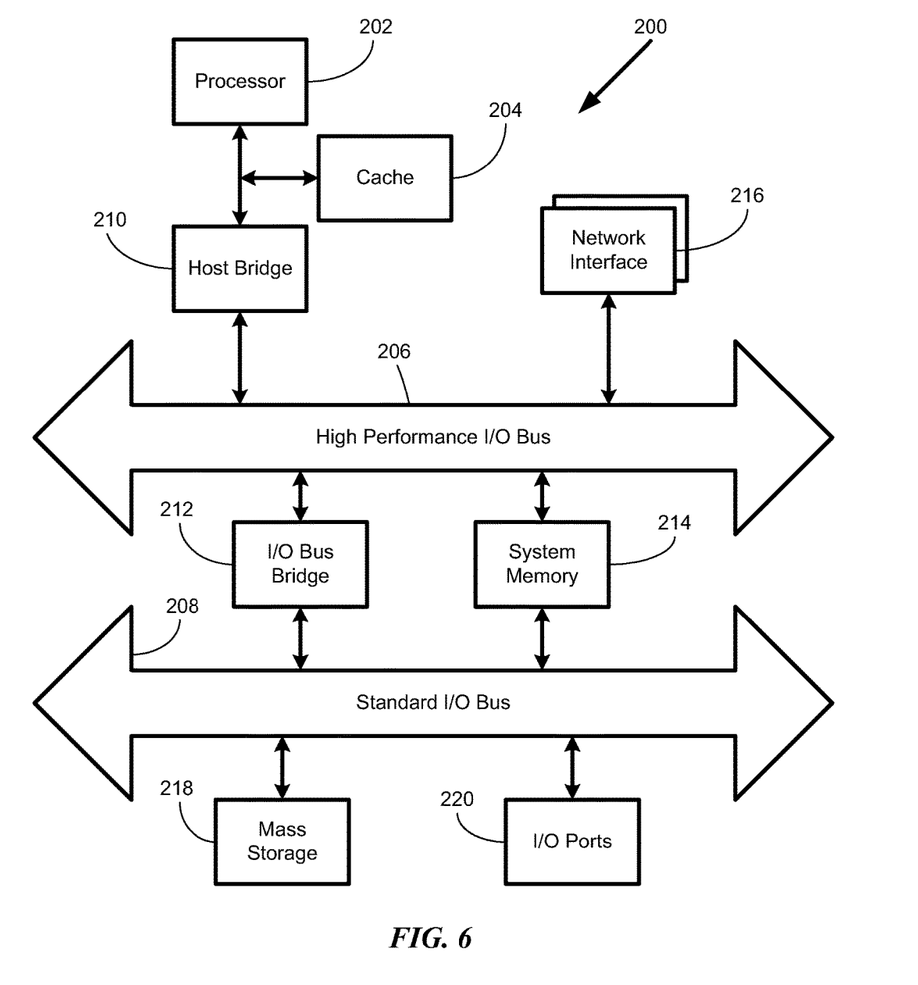
FIG. 6 is a schematic diagram illustrating an example computing system architecture that may be used to implement one or more physical servers depicted in FIG. 1.

FIG. 6 illustrates an example computing system architecture, which may be used to implement a physical server. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the location server 22, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist, with the components of hardware system 200 being coupled to the single bus. Furthermore, hardware system 200 may include additional components, such as additional processors, storage devices, or memories.

As discussed below, in one implementation, the operations of one or more of the physical servers described herein are implemented as a series of software routines run by hardware system 200. These software routines comprise a plurality or series of instructions to be executed by a processor in a hardware system, such as processor 202. Initially, the series of instructions may be stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. Of course, other implementations are possible. For example, the server functionalities described herein may be implemented by a plurality of server blades communicating over a backplane.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present invention has been explained with reference to specific embodiments. For example, while embodiments of the present invention have been described as operating in connection with HTML and HTTP, the present invention can be used in connection with any suitable protocol environment. Furthermore, implementations of the invention can be used in systems directed to serving geo-targeted content other than ads to users. Other embodiments will be evident to those of ordinary skill in the art. It is therefore not intended that the present invention be limited, except as indicated by the appended claims.

What is claimed is:

1. A method comprising:
   executing a first client node executing a single version of a cross-network social networking application within a first social networking platform, the cross-network social networking application being compatible with a plurality of social networking platforms and configured as a single version application for executing on more than one of the plurality of social networking platforms at a time, the cross-network social networking application supporting a set of social networking features, each of the plurality of social networking platforms supporting a subset of a set of social networking features supported by the cross-network social networking application;
   automatically identifying, by the cross-network social networking application, the first social networking platform and a library of functions associated with the first social network for at least interacting with other social networking platforms;
   automatically identifying, by the cross-network social networking application, the subset of features supported by the identified first social networking based on the library of functions associated with the first social networking platform;
   displaying, by the cross-network social networking application, a user interface providing access to each of the subset of features supported by the identified first social networking platform; and
   interacting, by the cross-network social networking application, with another cross-network social networking application executing on a second client node within a second social networking platform of the plurality of social networking platforms, said another cross-network social networking application providing access to a second subset of features supported by the second social networking platform.

2. The method of claim 1, wherein the subset of features supported by the identified first social network includes all of the set of social network features supported by the cross-network social networking application.

3. The method of claim 1, further comprising:
   executing the cross-network social networking application on the second social network, the cross-network social networking application automatically identifying the second social network;

automatically identifying, by the cross-network social networking application, the second subset of features supported by the identified second social network; and displaying, by the cross-network social networking application, a second user interface providing access to each of the second subset of features supported by the identified second social network.

4. The method of claim 1, wherein the cross-network social networking application comprises a single executable file.

5. The method of claim 4, wherein the single executable file is a Flash file.

6. The method of claim 1, wherein the cross-network social networking application comprises one or more ActionScript scripts.

7. The method of claim 1, wherein the social networking application is embodied in computer-executable instructions readable by one or more processors of a network application hosting site, the instructions, when read and executed, for causing the one or more processors to generate one or more social network webpages including the cross-network social networking application.

8. The method of claim 1, wherein at least one of the computer-executable instructions comprises PHP code.

9. The method of claim 1, further comprising:

receiving, by the cross-network social networking application, an input/output request associated with the cross-network social networking application; and in response to the input/output request, reading, by the cross-network social networking application, data from or storing data to a centralized data service, the centralized data service having stored thereon first data associated with at least one user of the cross-network social networking application on the first social network and second data associated with at least one user of the cross-network social networking application on the second social network.

10. A computing device comprising:

a processor;

a non-transitory computer-readable storage medium for tangibly storing thereon program logic for execution by the processor, the program logic comprising:

logic executed by the processor for executing a first client node executing a single version of a cross-network social networking application within a first social networking platform, the cross-network social networking application being compatible with a plurality of social networking platforms and configured as a single version application for executing on more than one of the plurality of social networking platforms at a time, the cross-network social networking application supporting a set of social networking features, each of the plurality of social networking platforms supporting a subset of a set of social networking features supported by the cross-network social networking application;

logic executed by the processor for automatically identifying, by the cross-network social networking application, the first social networking platform and a library of functions associated with the first social network for at least interacting with other social networking platforms;

logic executed by the processor for automatically identifying, by the cross-network social networking application, the subset of features supported by the identified first social networking based on the library of functions associated with the first social networking platform;

logic executed by the processor for displaying, by the cross-network social networking application, a user interface providing access to each of the subset of features supported by the identified first social networking platform; and logic executed by the processor for interacting, by the cross-network social networking application, with another cross-network social networking application executing on a second client node within a second social networking platform of the plurality of social networking platforms, said another cross-network social networking application providing access to a second subset of features supported by the second social networking platform.

11. The computing device of claim 10, further comprising:

logic executed by the processor for executing the cross-network social networking application on the second social network to automatically identify the second social network;

logic executed by the processor for automatically identifying, by the cross-network social networking application, the second subset of features supported by the identified second social network; and logic executed by the processor for displaying, by the cross-network social networking application, a second user interface providing access to each of the second subset of features supported by the identified second social network.

12. A non-transitory computer-readable storage medium, tangibly encoded with computer-executable instructions, that when executed by a computing device, perform a method comprising:

executing a first client node executing a single version of a cross-network social networking application within a first social networking platform, the cross-network social networking application being compatible with a plurality of social networking platforms and configured as a single version application for executing on more than one of the plurality of social networking platforms at a time, the cross-network social networking application supporting a set of social networking features, each of the plurality of social networking platforms supporting a subset of a set of social networking features supported by the cross-network social networking application;

automatically identifying, by the cross-network social networking application, the first social networking platform and a library of functions associated with the first social network for at least interacting with other social networking platforms;

automatically identifying, by the cross-network social networking application, the subset of features supported by the identified first social networking based on the library of functions associated with the first social networking platform;

displaying, by the cross-network social networking application, a user interface providing access to each of the subset of features supported by the identified first social networking platform; and interacting, by the cross-network social networking application, with another cross-network social networking application executing on a second client node within a second social networking platform of the plurality of social networking platforms, said another cross-network social networking application providing access to a second subset of features supported by the second social networking platform.

* * * * *